(12) United States Patent
Kawata et al.

(10) Patent No.: US 9,612,373 B2
(45) Date of Patent: Apr. 4, 2017

(54) LIGHT BLOCKING MEMBER APPLICABLE TO MICROSCOPE

(75) Inventors: Satoshi Kawata, Osaka (JP); Minoru Kobayashi, Osaka (JP); Naoyoshi Kubota, Osaka (JP)

(73) Assignee: NANOPHOTON CORPORATION, Osaka (JP)

( * ) Notice: Subject to any disclaimer, the term of this patent is extended or adjusted under 35 U.S.C. 154(b) by 714 days.

(21) Appl. No.: 13/981,185

(22) PCT Filed: Jan. 18, 2012

(86) PCT No.: PCT/JP2012/050886
§ 371 (c)(1),
(2), (4) Date: Sep. 24, 2013

(87) PCT Pub. No.: WO2012/102140
PCT Pub. Date: Aug. 2, 2012

(65) Prior Publication Data
US 2014/0002905 A1    Jan. 2, 2014

(30) Foreign Application Priority Data

Jan. 24, 2011    (JP) .................................. 2011-011953
Mar. 22, 2011    (JP) .................................. 2011-062993

(51) Int. Cl.
*G02B 21/00*    (2006.01)
*G02B 5/20*    (2006.01)
(Continued)

(52) U.S. Cl.
CPC ............... *G02B 5/20* (2013.01); *G02B 5/003* (2013.01); *G02B 21/06* (2013.01)

(58) Field of Classification Search
CPC ......... G03B 11/00; G03B 11/02; G03B 11/04; G03B 11/045; G03B 11/048; G03B 11/06;
(Continued)

(56) References Cited

U.S. PATENT DOCUMENTS 5,870,226 A * 2/1999 Sakamoto ............ G02B 25/001
359/368
6,439,242 B1 * 8/2002 Head ........................ A45D 8/00
132/273
(Continued)

FOREIGN PATENT DOCUMENTS

JP       04-107417        4/1992
JP       2002-207177 A    7/2002
(Continued)

OTHER PUBLICATIONS

Extended European Search Report for PCT/JP2012/050886 mailed May 28, 2014

*Primary Examiner* — Scott J Sugarman
*Assistant Examiner* — Robert E Tallman
(74) *Attorney, Agent, or Firm* — Smith, Gambrell & Russell, LLP.

(57) ABSTRACT

A light blocking member (18) for application, to a microscope is provided. Although it is producible at a sufficiently low cost, it can sufficiently block ambient light, and does not require a special operation when a sample (16) is placed on a stage (2) or the sample is taken out from above the stage. The light blocking member (18) is formed from a soft polymer, has an inner peripheral surface which is cylindrical in at least an upper part thereof, and is held on an objective lens assembly by fitting the upper part onto the outer peripheral surface of the objective lens assembly.

23 Claims, 9 Drawing Sheets

(51) Int. Cl.
*G02B 5/00* (2006.01)
*G02B 21/06* (2006.01)

(58) Field of Classification Search
CPC ........ G02B 23/00; G02B 23/14; G02B 23/16;
G02B 23/165; G02B 5/02; G02B 5/20;
G02B 21/24; G02B 21/34; G02B
23/2476; G02B 23/2484; G02B 23/2492;
G02B 26/02; G02B 27/0018; F16B 1/00;
F16B 2/00; F16B 2/005; F16B 2/02;
F16B 2/04; F16B 2/06; F16B 2/08; F16B
2/20; F16B 2/22; F16B 2/243; F16B
2/245; F16B 2/246; F16B 2/26
USPC .......................................... 359/611, 612, 600
See application file for complete search history.

(56) References Cited

U.S. PATENT DOCUMENTS 7,753,058 B2 * 7/2010 Chudzik .................. A45D 8/20
132/276
7,903,327 B2   3/2011 Karaki

FOREIGN PATENT DOCUMENTS

| | | | |
|---|---|---|---|
| JP | 2005-345718 A | * | 12/2005 |
| JP | 2006-11045 A | | 1/2006 |
| JP | 2008-262031 A | | 10/2008 |
| JP | 2009-98230 A | | 5/2009 |
| JP | 2009-982030 A | * | 5/2009 |
| WO | 2007/136075 A1 | | 11/2007 |

* cited by examiner

//LIGHT BLOCKING MEMBER APPLICABLE TO MICROSCOPE

TECHNICAL FIELD

This invention relates to a light blocking member advantageously applicable to, although not limited to, a microscope which detects weak light, such as a Raman microscope, in particular.

BACKGROUND ART

With the Raman microscope, for example, it is important to block light from the surrounding, namely, ambient light in order to detect weak Raman scattered light. It is also important that laser light which illuminates a sample be sufficiently prevented from leaking to the surroundings. As disclosed in Patent Documents 1 to 3 to be mentioned below, it has been common practice to dispose a cover member made of a thin metal plate which covers at least principal parts of the microscope, and to configure at least a part of the cover member to be openable and closable.

PRIOR ART DOCUMENTS

Patent Documents

Patent Document 1: JP-A-2006-11045
Patent Document 2: JP-A-2008-262031
Patent Document 3: JP-A-2009-96230

SUMMARY OF THE INVENTION

Problems to be Solved by the Invention

However, the above-mentioned cover member is relatively expensive. In addition, in either placing an object to be tested, namely, a sample, on a stage, or withdrawing the sample from above the stage, it has been necessary to move at least the part of the cover member in the opening or closing direction, thus complicating the procedure.

The present invention has been accomplished in the light of the above facts. A major technical challenge to the invention is to provide a novel and improved light blocking member which can sufficiently block ambient light, although it is producible at a sufficiently low cost; and which does not require a special operation when a sample is placed on a stage or the sample is taken out from above the stage.

Means for Solving the Problems

The present inventors nave conducted in-depth studies. As a result, they have found that the above major technical challenge can be solved by forming a light blocking member from a soft polymer, the light blocking member having an inner peripheral surface which is cylindrical in at least an upper part of the light blocking member, and the light blocking member being held on an objective lens assembly by fitting the upper part onto an outer peripheral surface of the objective lens assembly.

That is, according to the present invention, there is provided, as a light blocking member capable of solving the major technical challenge, a light blocking member to be applied to a microscope, the microscope having a stage on which a sample is placed, and an objective lens assembly opposing the stage, the objective lens assembly having a cylindrical outer peripheral surface, wherein the light blocking member has an inner peripheral surface which is cylindrical in at least an upper part of the light blocking member, the light blocking member is formed from a soft polymer, and the light blocking member is held on the objective tens assembly by fitting the upper part onto the outer peripheral surface of the objective lens assembly.

Preferably, the light blocking member has a transmittance of 1% or less for light in the wavelength region of 300 to 1000 nm. The light blocking member preferably has an impact resilience (JISK6255) of 30% or more, and a compression set (JISK6301) of 30% or less. Advantageously, the light blocking member does not break even when stretched 30%, and the light blocking member has an Asker C hardness of 10 to 40 and a specific gravity of 1 or less. Preferred examples of the soft polymer are closed cell sponges, especially, closed cell chloroprene rubber sponges. The light blocking member is preferably colored with carbon black. In a preferred embodiment, the upper part and the lower part of the light blocking member are different in hardness, and the hardness of the upper part is greater than the hardness of the lower part. Preferably, a slit extending entirely in the thickness direction and extending entirely in the axial direction is formed in the light blocking member. Advantageously, the slit is either inclined at an inclination angle of 30 to 70 degrees with respect to the radial direction, or extended in a convexly arcuate shape from the inner peripheral surface to the outer peripheral surface. The convexly arcuate shape preferably has a larger radius of curvature than the inner diameter of the inner peripheral surface. Preferably, a pair of grip pieces protruding from the outer peripheral surface is formed at circumferentially spaced locations on a side opposite diametrically to the slit. Advantageously, an elastic member is buried which extends in the circumferential direction from near one side, in the circumferential direction, of the slit to near another side of the slit away from the slit. In a preferred embodiment, the lower part of the light blocking member has an inner peripheral surface of a truncated cone shape whose outer diameter gradually increases downward; alternatively, the inner peripheral surface of the lower part is of a cylindrical shape having an inner diameter larger than the inner diameter of the upper part. Advantageously, at least one annular cut extending upward from the lower end is disposed in the lower part, and/or a plurality of cuts extending in the radial direction are disposed at circumferentially spaced locations in the lower part. A member to be detected can be buried in a lower end portion of the light blocking member.

Effects of the Invention

According to the light blocking member of the present invention, ambient light can be sufficiently blocked simply by fitting the light blocking member onto the outer peripheral surface of the objective lens assembly, although the light blocking member can be produced at a sufficiently low cost. In placing a sample on the stage, or taking out the sample from above the stage, it suffices to move the objective lens relatively away from the stage, and there is no need to remove the light blocking member from the objective lens assembly.

MODE FOR CARRYING OUT THE INVENTION

The preferred embodiments of the light blocking member constituted in accordance with the present invention will be described in further detail by reference to the accompanying drawings.

Figure 1:
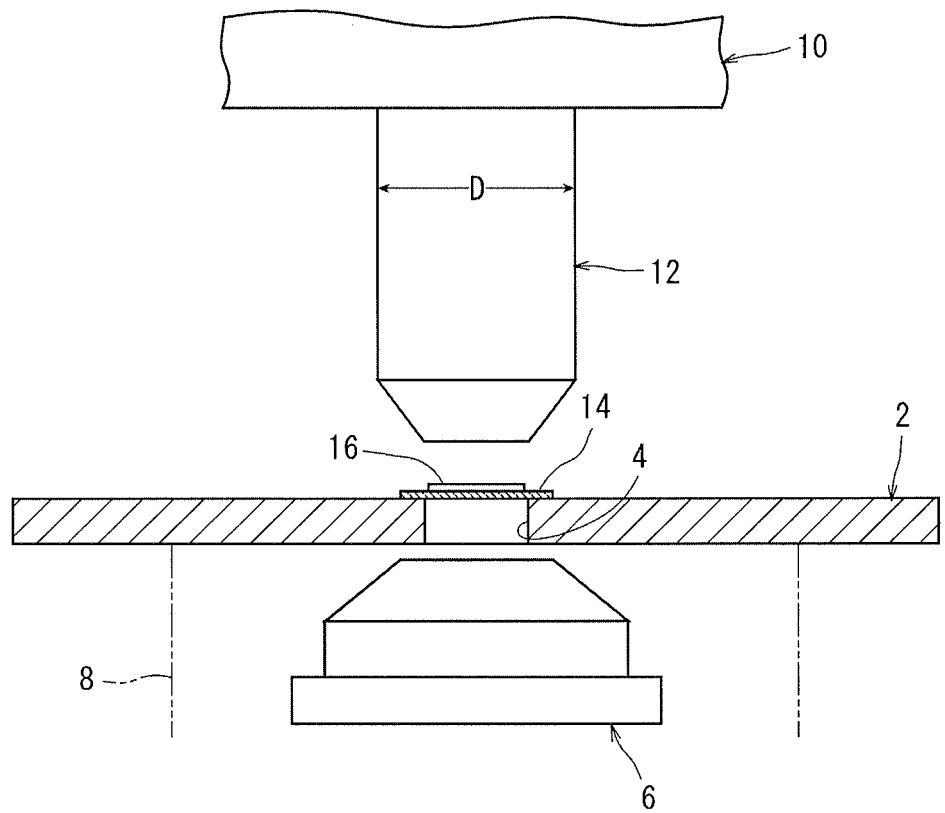
FIG. 1 is a partial sectional view showing essential parts of a Raman microscope to which, a light blocking member constituted, in accordance with the present invention is applied.
Figure 10:
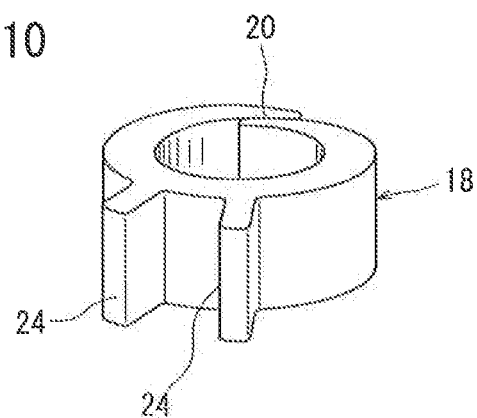
FIG. 10 is a perspective view showing a further modification of the light blocking member constituted in accordance with the present invention.

FIG. 1 briefly illustrates essential parts of a Raman microscope to which the light blocking member constituted in accordance with the present invention is applied. The illustrated Raman microscope includes a stage 2 allowed to extend substantially horizontally. The stage 2, which can be formed from a suitable metal plate such as a steel plate, is mounted to be movable in the X-direction (lateral direction in FIG. 1), in the Y-direction (direction perpendicular to the sheet face in FIG. 1), and in the Z-direction (vertical direction in FIG. 1). The stage 2 is moved, as appropriate, by a moving mechanism (not shown), which can be manually operated, in the X-direction, the Y-direction, and the Z-direction (if desired, instead of, or in addition to, the movement of the stage 2 in the Z-direction, an objective tens assembly 12 to be described later can be moved in the Z-direction). An opening 4 penetrating the stage 2 vertically is formed in the middle of the stage 2. Below the stage 2, a condenser lens assembly 6 is disposed to be ascendable and descendable, and is moved upward and downward by a raising and lowering mechanism (not shown) which can be manually operated. A suitable light blocking cover 8 for surrounding the condenser lens assembly 6 is disposed on the lower surface of the stage 2, and the lower surface of the stage 2 and the surroundings of the condenser lens assembly 6 are shielded from ambient light. An objective lens revolver 10 (only a part thereof is illustrated in FIG. 10) is disposed above the stage 2. A plurality of the objective lens assemblies 12 (only one of them is shown in FIG. 1) are mounted on the objective lens revolver 10. By rotating the objective lens revolver 10, the desired objective lens assembly 12 is positioned to oppose the opening 4 of the stage 2. The outer peripheral surface of a main part of the objective lens assembly 12 is in a cylindrical shape, and the outer peripheral surface of a lower end portion thereof is in an inverted truncated cone shape. A support glass plate 14 extending across the opening 4, for example, is placed on the upper surface of the stage 2, and a sample 16 is placed on the support glass plate 14. Since the above-described configuration of the illustrated Raman microscope is well known among people skilled in the art, its detailed explanation will be omitted herein.

Figure 2:
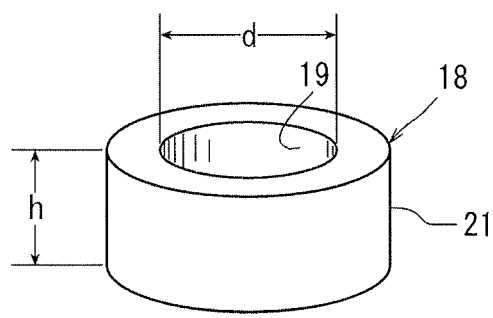
FIG. 2 is a perspective view showing a preferred embodiment of the light blocking member constituted in accordance with the present invention.
Figure 3:
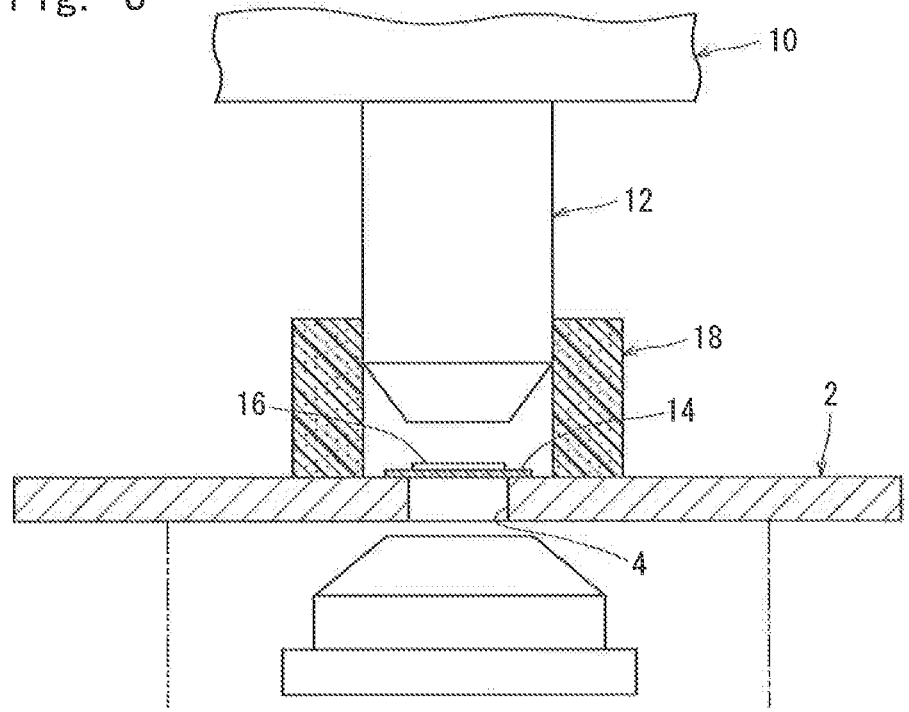
FIG. 3 is a partial sectional view showing a state in which the light blocking member illustrated in FIG. 2 has been applied to an objective lens assembly of the Raman microscope illustrated in FIG. 1.

With further reference to FIG. 2 illustrating an embodiment of the light blocking member constituted in accordance with the present invention, a light blocking member 18 illustrated herein is unitary in a cylindrical shape. The inner diameter d (diameter of the inner peripheral surface 19) of the light blocking member 18 is in correspondence with the outer diameter D of the outer peripheral surface of the main part of the objective lens assembly 12. Preferably, D−d=0 to 2 mm (0 mm≤D−d≤2.0 mm), particularly 0.5 to 1.5 mm (0.5 mm≤D−d≤1.5 mm). It is important that the height h of the light blocking member 18 be a length suitable for establishing a state in which an upper end portion of the light blocking member 18 engages the outer peripheral surface of the main part of the objective lens assembly 12 when the lower end surface of the light blocking member 18 is brought into contact with the upper surface of the stage 2 for the actual detection of the object 16 to be detected, as illustrated in FIG. 3.

The light blocking member 18 is formed from a soft polymer and, importantly, has sufficient light blocking properties, has sufficient elasticity and extensibility, and is sufficiently lightweight. In detail, in order to have sufficient light blocking properties, it is preferred that the transmittance during transmission from the inner peripheral surface 19 to the outer peripheral surface 21 of the light blocking member 18 be 1% or less, especially $1 \times 10^{-4}$% or less, for light in the wavelength region of 300 to 1000 nm used in the Raman microscope. To decrease the transmittance, it is desirable to mix carbon black into the soft polymer for coloration. From the viewpoints of sufficient elasticity and extensibility, it is preferred that the impact resilience (JISK6255) of the light blocking member 18 be 40% or more, particularly 30% or more, and that the compression set (JISK6301) of the light blocking member 18 be 40% or less, particularly 30% or less. In addition, it is desirable for the light blocking member 18 to be formed from a material which does not break even when stretched 30% or more, particularly 100% or more. The Asker C hardness of the light blocking member 18 is 10 to 40, particularly 20 to 30 and, desirably, the light blocking member 18 can be manually deformed with sufficient ease. The light blocking member 18 should be sufficiently lightweight, and it is important that the light blocking member 18 fitted onto the objective lens assembly 12 in a manner to be described later be held onto the objective lens assembly 12 without dropping. Advantageously, the specific gravity of the light blocking member 18 is 1 or less, particularly 0.5 or less. As the preferred soft polymer fulfilling the above-mentioned properties, closed cell sponges, especially, chloroprene rubber sponges colored with carbon black can be named. The chloroprene rubber sponge C-4305 is a closed cell sponge colored with carbon black, and has an Asker C hardness of 25 and a specific gravity of 0.19. When it is extended 150%, its breakage begins. When it is 10 mm thick, its transmittance for light in the wavelength range of 300 to 1000 nm is $1 \times 10^{-5}$% or less. Thus, it can be preferably used as a material for the light blocking member 18.

Figure 4:
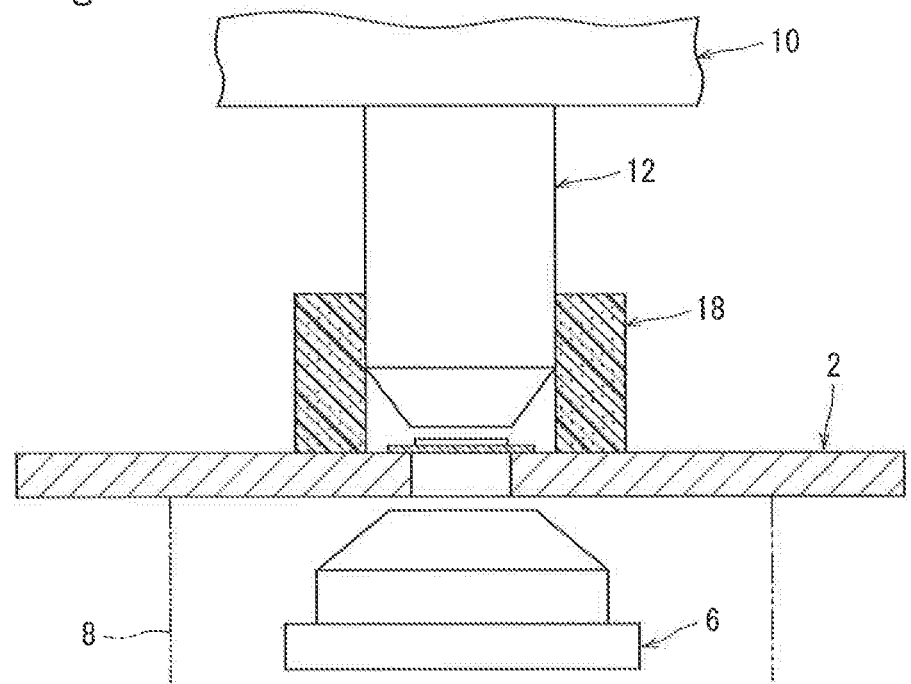
FIG. 4 is a partial sectional view showing a state in which a stage is slightly raised from the state illustrated in FIG. 3 to slightly displace the light blocking its ember upward with respect to the objective lens assembly.
Figure 5:
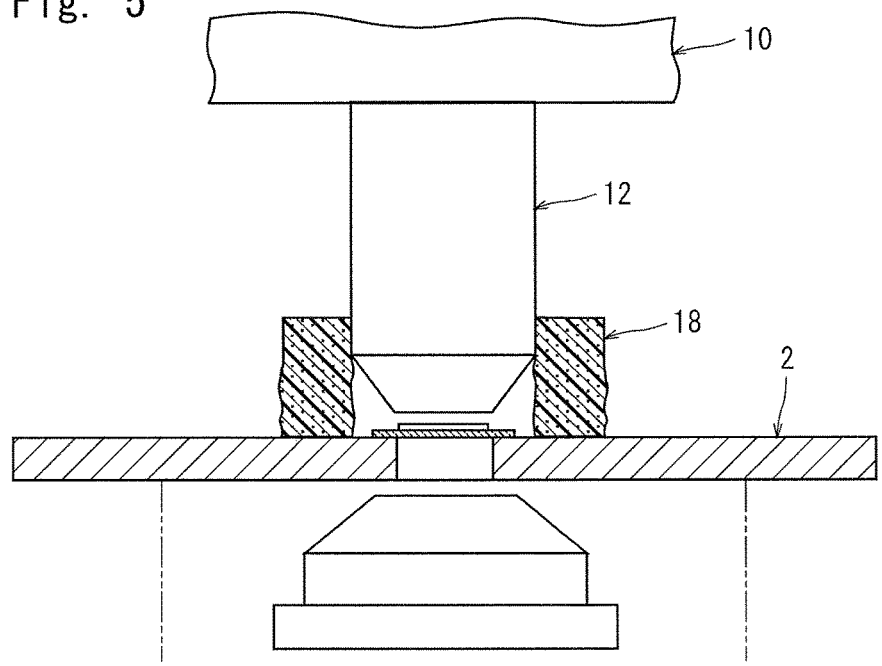
FIG. 5 is a partial sectional view showing a state in which the stage is slightly raised from the state illustrated in FIG. 3 to slightly compress a lower end portion of the light blocking member elastically.

The light blocking member 18 illustrated in FIG. 2 can be put to use in the following manner: The stage 2 is lowered, and sufficiently separated from the lower end of the objective lens assembly 12. Then, the light blocking member 18 is moved upward from the lower end of the objective lens assembly 12, and somewhat expanded in the radial direction. In this state, an upper part of the light blocking member 18 is fitted onto the outer peripheral surface of the main part of the objective lens assembly 12, as shown, in FIG. 3. The light blocking member 18 is held in the state, in which it is fitted onto the objective lens assembly 12, by its own elastically gripping action. It is important for a lower end portion of the light blocking member 18 to extend out downwardly beyond the lower end of the objective lens assembly 12. The stage 2 is raised to the position illustrated in FIG. 3 to bring the upper surface of the stage 2 into contact with the lower end surface of the light blocking member 18. At this time, the support glass plate 14 and the sample 16 are surrounded, with the objective lens assembly 12 and the light blocking member 18 along with the upper surface of the stage 2, and thereby shielded from ambient light. Also, laser light with which the sample 16 is irradiated can be prevented sufficiently reliably from leaking to the surroundings. Upon slight elevation of the stage 2 for focusing or the like, when the elastically gripping force of the light blocking member 18 is relatively small, the light blocking member 18 is slightly displaced upward with respect to the objective lens assembly 12, as shown in FIG. 4, to compensate for the ascent of the stage 2. When the elastically gripping force of the light blocking member 18 is relatively great, the lower end portion of the light blocking member 18 is slightly compressed elastically, as shown in FIG. 5, to compensate for the ascent of the stage 2. When the support glass plate 14 and the sample 16 are to be placed on the stage 2 or the support glass plate 14 and the sample 16 are to be taken out from above the stage 2, it suffices simply to lower the stage 2, thereby separating it from the objective lens assembly 12 and the light blocking member 18. It is not necessary to remove the light blocking member 18 from the objective lens assembly 12.

Figure 6:
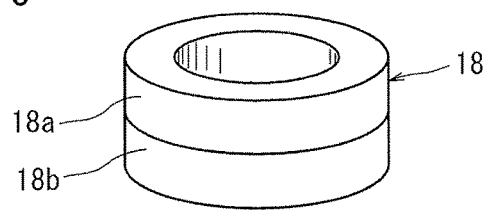
FIG. 6 is a perspective view showing a modification of the light blocking member constituted in accordance with the present invention.

FIGS. 6 to 20 illustrate modifications of the light blocking member constituted in accordance with the present invention. The light blocking member 18 illustrated in FIG. 2 is formed, entirely from a single soft polymer. In the modification illustrated in FIG. 6, on the other hand, an upper part 18a and a lower part 18b are formed from soft polymers different from each other. The upper part 18a is formed from a soft polymer having relatively high hardness, while the lower part 18b is formed from a soft polymer having relatively low hardness. Since the upper part 18a to be fitted onto the outer peripheral surface of the objective lens assembly 12 is relatively hard, it can be mounted on the objective lens assembly 12 sufficiently firmly. The lower part 18b, by contrast, is relatively soft, so that it is elastically deformed with ease, and can be reliably brought into intimate contact with the stage 2, the support glass plate 14 or the sample 16.

Figure 7:
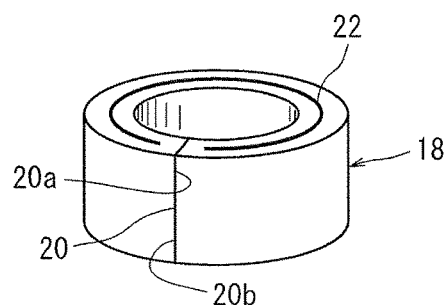
FIG. 7 is a perspective view showing another modification of the light blocking member constituted in accordance with the present invention.

In the modification illustrated in FIG. 7, a slit 20 is formed which extends entirely in the thickness direction and extends entirely in the height direction, i.e., the axial direction. Further, an elastic member 22 is buried which extends in an arcuate form from near one side 20a, in the circumferential direction, of the slit 20 to near the other side 20b of the slit 20. The length in the axial direction of the elastic member 22 is the same as the length in the axial direction of the light blocking member 18 (accordingly, in the axial direction, the elastic member 22 exists over the entire length of the light blocking member 18), or may be shorter than the latter length in the axial direction. The elastic member 22 can be formed, for example, from a spring steel sheet. According to the so configured light blocking member 18, both sides 20a, 20b of the slit 20 are elastically separated to enlarge the slit 20, whereby the light blocking member 18 can be fitted onto the objective lens assembly 12 not from below, but from beside, the objective lens assembly 12 (hence, in fitting the light blocking member 18 onto the objective lens assembly 12, there is no need to lower the stage 2, thereby separating it from the objective lens assembly 12). Even if the slit 20 is considerably enlarged, the slit 20 is sufficiently closed reliably by the elastic action of the elastic member 22 after the light blocking member 18 is fitted onto the objective lens assembly 12. As a result, the light blocking member 18 is held by the objective lens assembly 12 sufficiently firmly.

Figure 8:
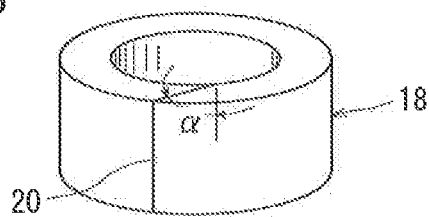
FIG. 8 is a perspective view showing still another modification of the light blocking member constituted in accordance with the present invention.

In the modification illustrated in FIG. 8, the slit 20 extends at an inclination angle α, which is preferably 30 to 70 degrees, with respect to the radial direction. The so configured light blocking member 18 deals with the following problem: After the light blocking member 18 is fitted onto the objective lens assembly 12, there may be a case in which the slit 20 is not completely closed, but some clearance is formed. Even in this case, the resulting clearance extends obliquely relative to the radial direction, so that the light blocking effect is not impaired.

Figure 9:
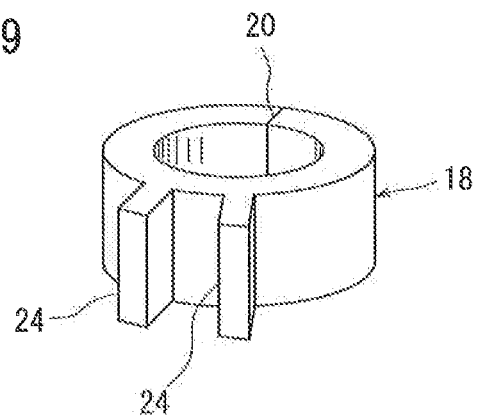
FIG. 9 is a sectional view showing yet another modification of the light blocking member constituted in accordance with the present invention.

In the modification illustrated in FIG. 9, a pair of grip pieces 24 protruding from the outer peripheral surface at circumferentially spaced locations is integrally formed on a side opposite diametrically to the slit 20. In the so configured light blocking member 18, the slit 20 can be expanded sufficiently easily by gripping the pair of grip pieces 24 to force them toward each other.

Figure 11:
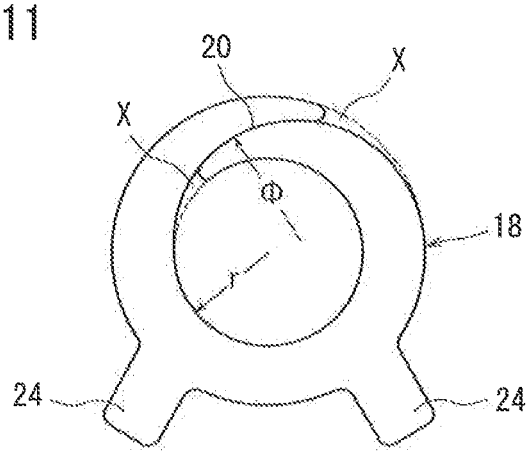
FIG. 11 is a plan view of the light blocking member illustrated in FIG. 10.

In the modification illustrated in FIGS. 10 and 11, the slit 20 is extended, in an arcuate shape from the inner peripheral surface to the outer peripheral surface. The radius of curvature, φ, of the slit 20 is set to be larger than the radius r of the inner peripheral surface. At both ends of the slit 20 (areas indicated by symbols X in FIG. 11), the soft polymer is missing to avoid the presence of sharp leading ends which are apt to damage. In the so configured light blocking member 18, even when the inner diameter of the light blocking member 18 is increased according to changes in the outer diameter of the objective lens assembly 12, the occurrence of a clearance in the slit 20 is avoided as far as possible.

Figure 12:
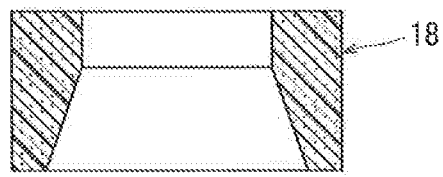
FIG. 12 is a sectional view showing a still further modification of the light blocking member constituted in accordance with the present invent ion.

In the modification illustrated in FIG. 12, the inner peripheral surface of the upper part of the light blocking member 18 is in a cylindrical shape, whereas the inner peripheral surface below this part is of a truncated cone shape whose inner diameter gradually increases downwardly. According to the so configured light blocking member 18, even when the sample 16 or the support glass plate 14, on which the sample 16 is placed, is of a shape somewhat projecting beyond the outer peripheral surface of the main part of the objective lens assembly 12, the sample 16 or the support glass plate 14 can be accommodated in the light blocking member 18.

Figure 13:
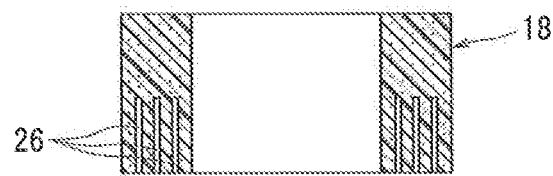
FIG. 13 is a sectional view showing a yet further modification of the light blocking member constituted in accordance with the present invention.

In the modification illustrated in FIG. 13, three annular cuts 26 extending upward from the lower end are formed concentrically in the lower part of the light blocking member 18. If desired, one or two or four or more annular cuts can be formed. In the so configured light blocking member 18, even when the sample 16 or the support glass plate 14, on which the sample 16 is placed, is of a shape somewhat projecting beyond the outer peripheral surface of the main part of the objective lens assembly 12, the lower part of the light blocking member 18 is displaced radially outwardly with sufficient ease, thus making it possible to cover the sample 16 or the support glass plate 14 on which the sample 16 is placed.

Figure 14:
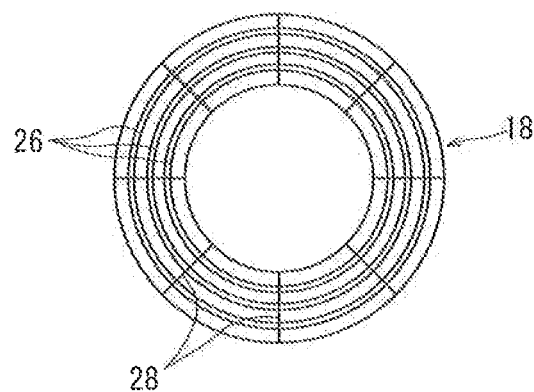
FIG. 14 is a bottom view showing a yet further modification of the light blocking member constituted in accordance with the present invention.

In the modification illustrated in FIG. 14, in addition to the formation of the three concentric annular cuts 26 in the lower part of the light blocking member 18, a plurality of (eight in the illustrated example) cuts 28 extending radially from the inner peripheral surface to the outer peripheral surface are disposed in the lower part at circumferentially equally spaced locations. If desired, it is permissible to omit the annular cuts 26 and dispose only the plurality of cuts 28 extending in the radial direction.

Figure 15:
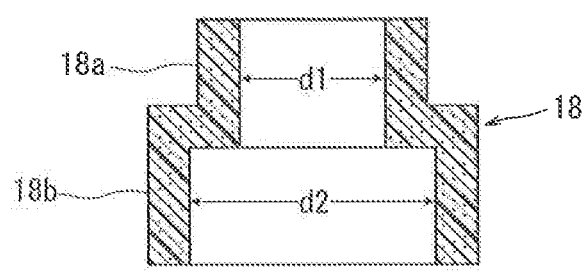
FIG. 15 is a sectional view showing a yet further modification of the light blocking member constituted in accordance with the present invention.
Figure 16:
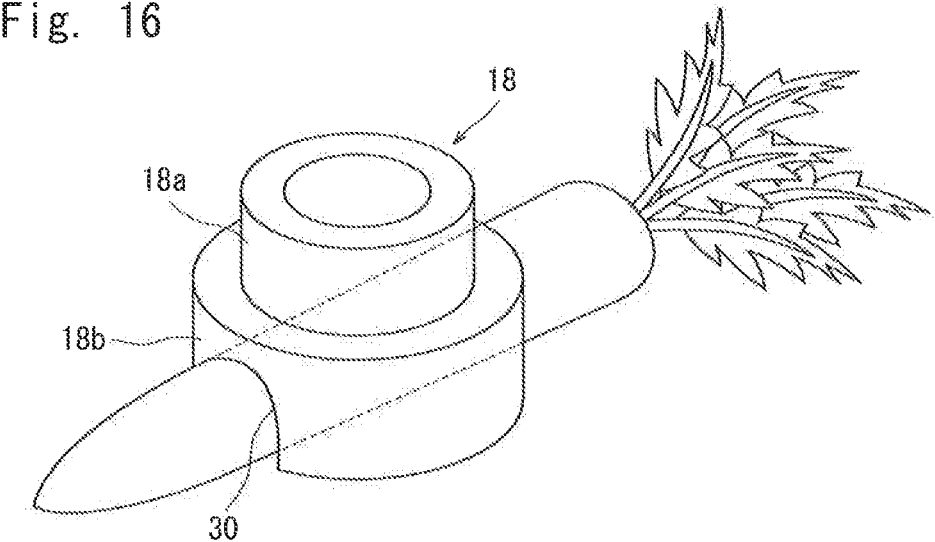
FIG. 16 is a perspective view showing the form of use of the light blocking member illustrated in FIG. 15.

In the modification illustrated in FIG. 15, the inner diameter d1 of the upper part 18a of the light blocking member 18 is a dimension corresponding to the outer diameter D of the objective lens assembly 12, while the inner diameter d2 of the lower part 18b is set to be considerably greater than the inner diameter d1 of the upper part 18a. The so configured light blocking member 18 can be used advantageously when the sample 16 is relatively large enough to extend beyond the outer peripheral surface of the objective lens assembly 12. When the sample 16 extends long beyond the inner peripheral surface of the lower part 18b of the light blocking member 18, as illustrated in FIG. 16, the lower part 18b of the light, blocking member 18 is cut, as appropriate, depending on the shape of the sample 16, whereby a cutout 30 allowing the sample 16 to extend beyond the light blocking member 18 can be formed.

Figure 17:
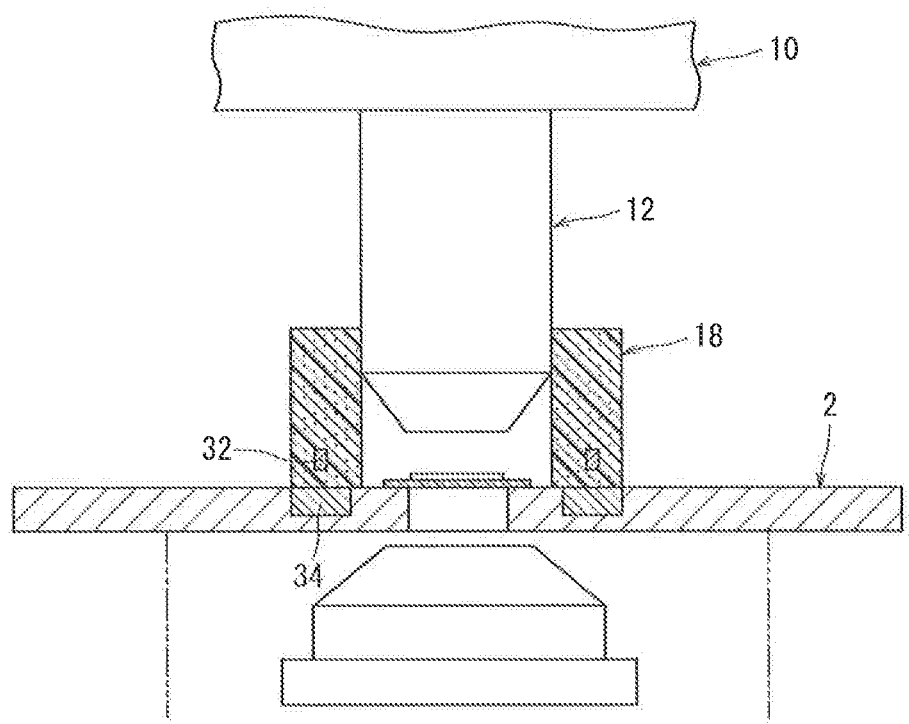
FIG. 17 is a sectional view showing a yet further modification of the light blocking member constituted in accordance with the present invention.

In the modification illustrated in FIG. 17, a member 32 to be detected, which may, for example, be a toroidal permanent magnet, is buried in the lower end portion of the light blocking member 18. On the other hand, either a detector 34 which can be composed of a proximity switch is disposed, or a plurality of the detectors 34 are disposed at circumferentially spaced locations, in the stage 2. In such a modification, when the state illustrated in FIG. 17, namely the light blocking member 18 is fitted on the objective lens assembly 12, the state in which the support glass plate 14 and the sample 16 are surrounded with the objective lens assembly 12 and the light blocking member 18 along with the upper surface of the stage 2, and thereby shielded from ambient light, is established, the detector 34 detects the member 32 to be detected, generating a signal indicating the establishment of a state which allows the irradiation of the sample 16 with laser light.

Figure 18:
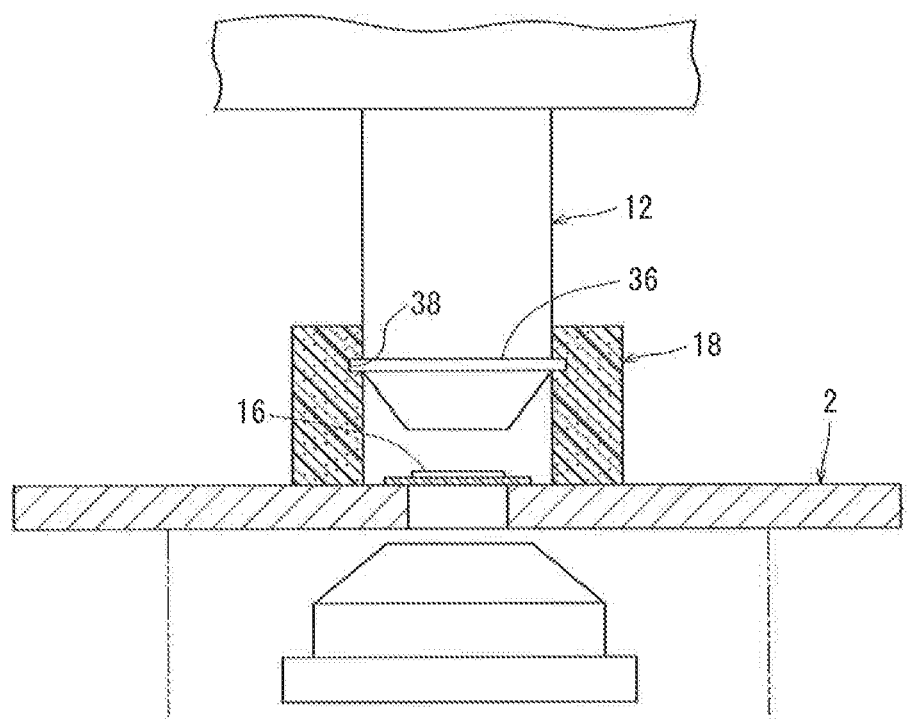
FIG. 18 is a sectional view showing a yet further modification of the light blocking member constituted in accordance with the present invention.

In the modification illustrated in FIG. 18, an auxiliary ring 36 fitted on the outer peripheral surface of the main part of the objective lens assembly 12 is annexed to the light blocking member 18. The auxiliary ring 36 is formed of a suitable elastic material such as spring steel and, advantageously, is elastically held on the outer peripheral surface of the main part of the objective lens assembly 12 and is positionally adjustable in the axial direction. In the light blocking member 18 itself, an annular ring-accommodating groove 38 conformed to the shape and dimensions of the auxiliary ring 36 is formed, in the inner peripheral surface of the upper part of the light blocking member 18. As illustrated in FIG. 18, the light blocking member 18 is mounted on the objective lens assembly 12, with the auxiliary ring 36 being accommodated in its ring-accommodating groove 38. In the light blocking member 18 of such a configuration, the position in the axial direction of the light blocking member 18 with respect to the objective lens assembly 12 can be finely set by finely adjusting the position in the axial direction of the auxiliary ring 36 with respect to the objective lens assembly 12. For example, in order to change the site of irradiation of the sample with laser light, the stage 2 is moved, in the lateral direction or in a direction perpendicular to the sheet face in FIG. 18, with respect to the objective lens assembly 12. During this movement, the thin sample 16 needs to be reliably prevented from contacting the light blocking member 18 and thereby being contaminated. For this purpose, the lower end surface of the light blocking member 18 can be positioned slightly above the upper surface of the sample 16 (this procedure impairs the light blocking effect of the light blocking member 18 relatively limitedly).

Figure 19:
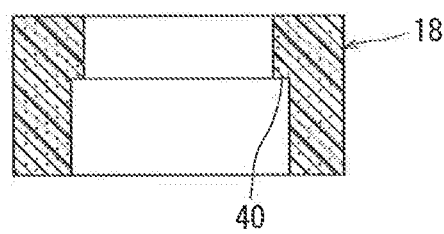
FIG. 19 is a sectional view showing a yet further modification of the light blocking member constituted in accordance with, the present invention.

The light blocking member 18 illustrated in FIG. 19 can be used together with the auxiliary ring 36, instead of the light blocking member 18 illustrated in FIG. 18. In the light blocking member 18 illustrated in FIG. 19, an annular shoulder surface 40 directed downward is defined in the inner peripheral surface of the upper part. The inner diameter upward of the annular shoulder surface 40 is smaller than the outer diameter of the auxiliary ring 36, and is in conformity with the outer diameter of the outer peripheral surface of the main part of the objective lens assembly 12. The inner diameter downward of the annular shoulder surface 40 is the same as or somewhat larger than the outer diameter of the auxiliary ring 36. The so configured light blocking member 18 is mounted on the objective lens assembly 12 by locking the annular shoulder surface 40, which is defined in the inner peripheral surface of the light blocking member 18, onto the annular upper surface of the auxiliary ring 36. The position in the axial direction of the light blocking member 18 with respect to the objective lens assembly 12 can be finely set by finely adjusting the position in the axial direction of the auxiliary ring 36 with respect to the objective lens assembly 12.

Figure 20:
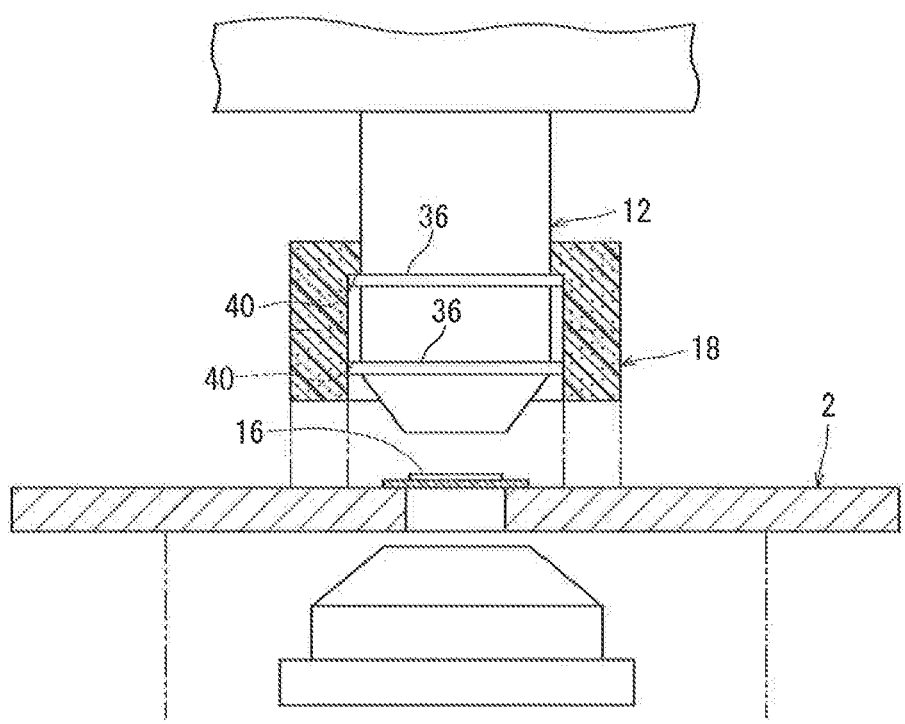
FIG. 20 is a sectional view showing a yet further modification of the light blocking member constituted in accordance with the present invention.

In the embodiment illustrated in FIG. 20, two of the auxiliary rings 36 are fitted, with spacing in the axial direction, onto the outer peripheral surface of the main part of the objective lens assembly 12. If the annular shoulder surface 40 is used in the inner peripheral surface of the upper part, replacement of the sample 16, for example, is performed in the following manner: As shown in FIG. 20, the annular shoulder surface 40 of the light blocking member 18 is locked to the annular upper surface of the auxiliary ring 36 located at the upper position to mount the light blocking member 18 on the objective lens assembly 12, whereby the lower end surface of the light blocking member 18 can be retracted above the lower end surface of the objective lens assembly 12. In irradiating the sample 16 with laser light, as indicated by dashed double-dotted lines in FIG. 20, the light blocking member 18 is displaced downward to lock its annular shoulder surface 40 to the annular upper surface of the auxiliary ring 36 located at the lower position, thereby mounting the light blocking member 18 on the objective lens assembly 12 and bringing the lower end surface of the light blocking member 18 into contact with the upper surface of the stage 2. In this manner, ambient light can be blocked as required.

EXPLANATIONS OF LETTERS OR NUMERALS

2: Stage
12: Objective lens assembly
16: Sample
18: Light blocking member
20: Slit
22: Elastic member
24: Grip piece
26: Cut
28: Cut
32: Member to be detected
36: Auxiliary ring
38: Annular ring-accommodating groove
40: Annular shoulder surface

The invention claimed is:

1. A light blocking member to be applied to a microscope, the microscope having a stage on which a sample is placed, and an objective lens assembly opposing the stage, the objective lens assembly having a cylindrical outer peripheral surface,
   the light blocking member comprising an inner peripheral surface which is cylindrical in at least an upper part of the light blocking member, and an outer peripheral surface extending to a lower part of the light blocking member, wherein
   the light blocking member unitarily is formed from a soft polymer having elasticity providing an elastic action,
   the light blocking member has a slit extending from the outer peripheral surface entirely through the inner peripheral surface in both a thickness direction and an axial direction of the member, the slit having opposite sides, and
   the light blocking member enlarges by separation of the sides of the slit to fit the upper part onto the outer peripheral surface of the objective lens assembly, the elastic action alone closing the slit and holding the light blocking member onto the objective lens without dropping therefrom.

2. The light blocking member according to claim 1, which has a transmittance of 1% or less for light in a wavelength region of 300 to 1000 nm during transmission from the inner peripheral surface to the outer peripheral surface thereof.

3. The light blocking member according to claim 1, which has an impact resilience (JISK6255) of 40% or more, and a compression set (JISK6301) of 40% or less.

4. The light blocking member according to claim 1, which does not break even when stretched 30%.

5. The light blocking member according to claim 1, which has an Asker C hardness of 10 to 40.

6. The light blocking member according to claim 1, which has a specific gravity of 1 or less.

7. The light blocking member according to claim 1, which is formed from a closed cell sponge.

8. The light blocking member according to claim 7, which is formed from a chloroprene rubber sponge.

9. The light blocking member according to claim 1, which is colored with carbon black.

10. The light blocking member according to claim 1, Wherein the upper part and the lower part are different in hardness, and wherein the hardness of the upper part is greater than the hardness of the lower part.

11. The light blocking member according to claim 1, wherein the slit is inclined at an inclination angle of 30 to 70 degrees with respect to a radial direction.

12. The light blocking member according to claim 1, wherein the slit is extended in a convexly arcuate shape from the inner peripheral surface to the outer peripheral surface.

13. The light blocking member according to claim 12, wherein the convexly arcuate shape has a larger radius of curvature than an inner diameter of the inner peripheral surface.

14. The light blocking member according to claim 1, wherein grip pieces protrude from the outer peripheral surface, the grip pieces being formed at circumferentially spaced locations on a side of the light blocking member opposite the slit.

15. A light blocking member to be applied to a microscope, the microscope having a stage on which a sample is placed, and an objective lens assembly opposing the stage, the objective lens assembly having a cylindrical outer peripheral surface,
   the light blocking member comprising an inner peripheral surface which is cylindrical in at least an upper part of the light blocking member, and an outer peripheral surface extending to a lower part of the light blocking member, wherein
   the light blocking member is formed from a soft polymer and an elastic member buried within the soft polymer,
   the light blocking member has a slit extending from the outer peripheral surface entirely through the inner peripheral surface in both a thickness direction and an axial direction of the member, whereby the elastic member extends in a circumferential direction from near one side, in the circumferential direction, of the slit to near another side of the slit.

16. The light blocking member according to claim 1, wherein the lower part of the light blocking member has an inner peripheral surface of a truncated cone shape whose outer diameter gradually increases downwardly.

17. The light blocking member according to claim 1, wherein the inner peripheral surface is cylindrical in the lower part of the light blocking member and has an inner diameter larger than an inner diameter of the upper part.

18. A light blocking member to be applied to a microscope, the microscope having a stage on which a sample is placed, and an objective lens assembly opposing the stage, the objective lens assembly having a cylindrical outer peripheral surface,
   the light blocking member comprising an inner peripheral surface which is cylindrical in at least an upper part of the light blocking member, and an outer peripheral surface extending to a lower part of the light blocking member, wherein the light blocking member is formed from a soft polymer, the light blocking member is held on the objective lens assembly by fitting the upper part onto the outer peripheral surface of the objective lens assembly, and the lower part of the light blocking member has plural annular cuts between the inner peripheral surface and the outer peripheral surface, each of the annular cuts extending upwardly in an axial direction from a lower end of the lower part.

19. A light blocking member to be applied to a microscope, the microscope having a stage on which a sample is placed, and an objective lens assembly opposing the stage, the objective lens assembly having a cylindrical outer peripheral surface, the light blocking member comprising an inner peripheral surface which is cylindrical in at least an upper part of the light blocking member, and an outer peripheral surface extending to a lower part of the light blocking member, wherein the light blocking member is formed from a soft polymer, the light blocking member is held on the objective lens assembly by fitting the upper part onto the outer peripheral surface of the objective lens assembly, and the lower part of the light blocking member has plural radial cuts extending in a radial direction from the outer peripheral surface through the inner peripheral surface.

20. A light blocking member to be applied to a microscope, the microscope having a stage on which a sample is placed, and an objective lens assembly opposing the stage, the objective lens assembly having a cylindrical outer peripheral surface, the light blocking member comprising a cylindrical wall having an upper part, a lower part, an inner peripheral surface and an outer peripheral surface, wherein the light blocking member is formed from a soft polymer, the light blocking member is held on the objective lens assembly by fitting the upper part onto the outer peripheral surface of the objective lens assembly, and a member to be detected is buried within the wall between the inner peripheral surface and the outer peripheral surface in the lower part of the light blocking member.

21. The light blocking member according to claim 1, wherein an auxiliary ring to be fitted on the outer peripheral surface of the objective lens assembly is included, an annular ring-accommodating groove conformed to the auxiliary ring is formed in the inner peripheral surface of the upper part of the light blocking member, or an annular shoulder surface directed downward is formed in the inner peripheral surface of the upper part, an inner diameter upward of the annular shoulder surface is smaller than an outer diameter of the auxiliary ring, and an inner diameter downward of the annular shoulder surface is the same as or larger than the outer diameter of the auxiliary ring.

22. The light blocking member according to claim 21, wherein the auxiliary ring is formed from elastic material, and is fitted onto the outer peripheral surface of the objective lens assembly such that its position in the axial direction is adjustable.

23. The light blocking member according to claim 20, which includes two auxiliary rings fitted onto the outer peripheral surface of the objective lens assembly at axially spaced locations.

* * * * *